US006236527B1

(12) United States Patent
Uchiike et al.

(10) Patent No.: US 6,236,527 B1
(45) Date of Patent: May 22, 2001

(54) DISK DRIVE WITH ACTUATOR LOAD/UNLOAD CONTROLLER

(75) Inventors: Hiroshi Uchiike, Yamato; Kenji Ogasawara, Fujisawa; Yoshiro Amano, Yokohama; Masahiro Shimizu; Shusuke Kurihara, both of Yamato; Kazunari Tsuchimto, Sagamihara; Nobuyuki Kitazaki, Chigasaki; Shinji Ueno, Fujisawa; Isao Yoneda, Yokohama; Yuji Yokoe, Yokohama; Fuminori Sai, Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/103,758

(22) Filed: Jun. 24, 1998

(30) Foreign Application Priority Data

Jun. 24, 1997 (JP) .................................................. 9-167296

(51) Int. Cl.[7] .................................................... G11B 21/02
(52) U.S. Cl. ......................................... 360/75; 360/78.04
(58) Field of Search .................................... 360/75, 78.04

(56) References Cited

U.S. PATENT DOCUMENTS 4,237,501 * 12/1980 Barmache et al. ...................... 360/75
5,227,929 * 7/1993 Comerford ............................. 360/75

FOREIGN PATENT DOCUMENTS

| 5-101573 | 4/1993 | (JP) | G11B/21/12 |
| 5-258496 | 10/1993 | (JP) | G11B/21/21 |
| 5-307851 | 11/1993 | (JP) | G11B/21/21 |
| 6-236644 | 8/1994 | (JP) | G11B/21/22 |

* cited by examiner

*Primary Examiner*—W. Chris Kim
*Assistant Examiner*—Dan I. Davidson
(74) *Attorney, Agent, or Firm*—G. Marlin Knight

(57) ABSTRACT

A disk drive with means to prevent accidental landing of a head/slider on the disk surface is described. In one embodiment a shock sensor is provided to sense external shocks received by the mechanism. During loading (positioning) of the actuator bearing the head/slider over the disk, if a shock is sensed, loading is stopped and an immediate unloading is performed to return the actuator to the withdrawn position. In another embodiment the unload operation is performed when the rotational speed of the disk is changed. In another embodiment the unload operation is performed when the rotational speed of the disk drops below a threshold. A circuit and method for detecting when the rotational speed of the disk drops below a threshold is also provided. The unloading in the various embodiments may be performed using velocity control or without velocity control.

2 Claims, 13 Drawing Sheets

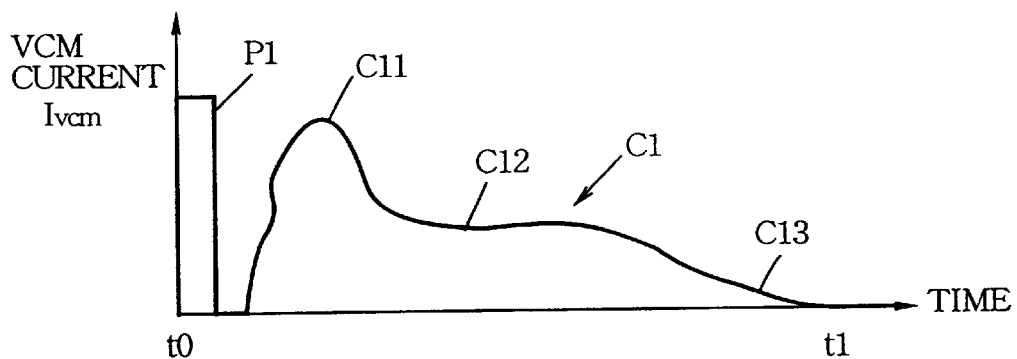
FIG. 4(a)
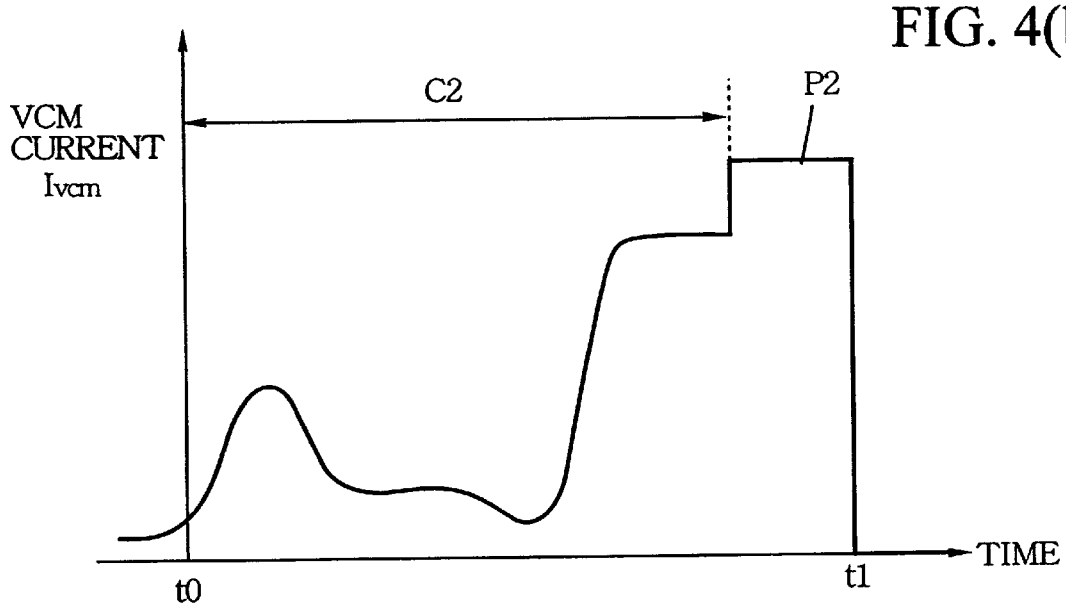
FIG. 4(b)
FIG. 5
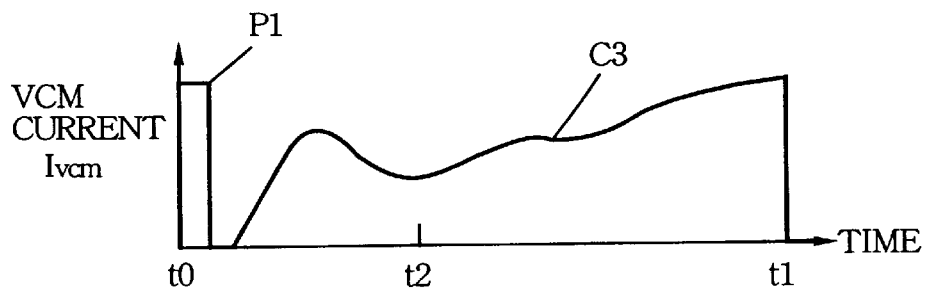

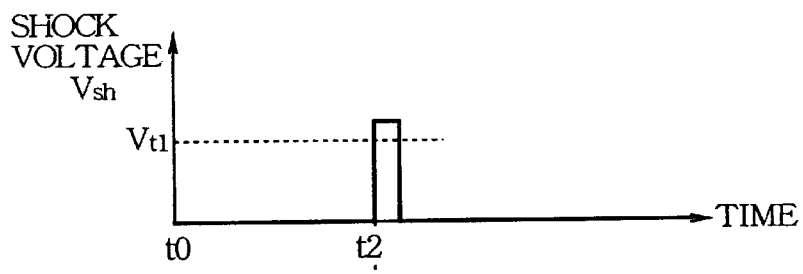
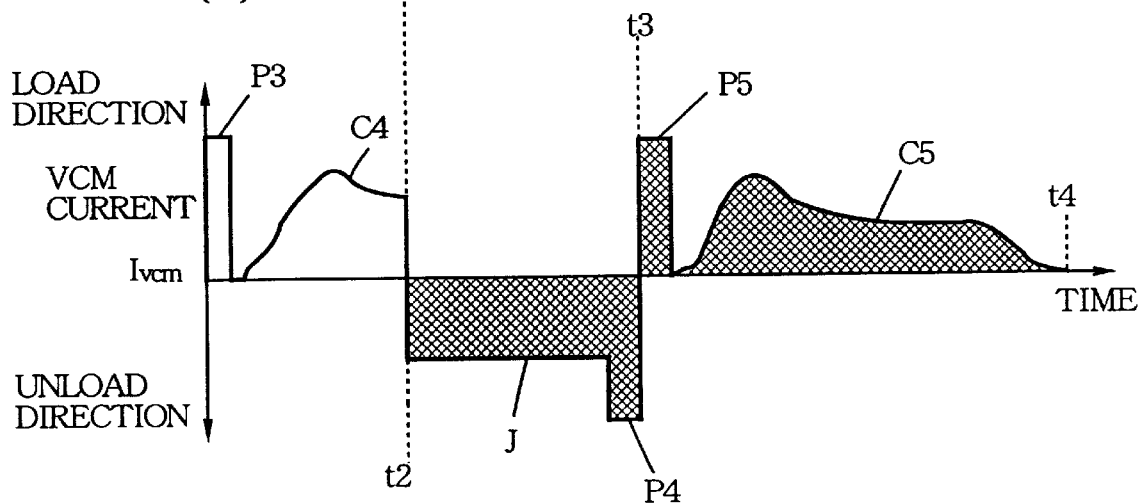

DISK DRIVE WITH ACTUATOR LOAD/UNLOAD CONTROLLER

FIELD OF THE INVENTION

The present invention relates to a disk drives and more particularly to control of a disk drive's actuator movement during mechanical shock events or other exceptional events.

BACKGROUND OF THE INVENTION

Contact start/stop (CSS) mechanisms, load/unload mechanisms, and other mechanisms are found in disk drives as head mechanisms that cause a head/slider having at least one and typically two transducer heads to enter the data area on the disk or withdraw therefrom. The head mechanism does not intentionally let the head/slider touch the data area of the disk. A CSS mechanism causes the head/slider to withdraw to a landing zone on the disk before it touches the disk surface. A load/unload mechanism causes the head/slider to withdraw outside the disk, by moving the head arm that carries the head/slider onto a ramp provided near the inner diameter or outer diameter of the disk (thus unloading the head/slider), or causes the head/slider to move unloading the head/slider), or causes the head/slider to move onto the disk by moving the head arm from the ramp (thus loading the head/slider). A load/unload mechanism does not intentionally let the head/slider touch the disk surface. The operations of these types of head mechanisms are controlled by a head mechanism controller.

The data area surface of the disk of a CSS-type disk drive, and the disk surface of a load/unload-type disk drive, are smoothed; if the head/slider accidentally touches these smoothed surfaces, that is, if an accidental landing occurs, the disk surface may be damaged, or the head/slider may stick to the disk surface. In a load/unload-type of disk drive, there is a particularly high risk that the head/slider might stick due to an accidental landing, because the smoothness of the disk surface is heightened in order to heighten the data recording density by lowering the flying height of the head/slider from the disk surface. Some head mechanism controllers are provided with means for avoiding accidental landings.

As an example of a head mechanism controller provided with means for avoiding accidental landings, there is the head retract processor disclosed in Japanese Unexamined Patent Application 147463/1992. This head retract processor unloads the head/slider from the disk (causing it to withdraw from the data area) when it senses either vibration or a power supply drop.

In addition, the driving source signals such as clock signals to the driving circuit of the spindle motor that rotates the disk in a disk drive is controlled by a signal supply controller. Upon receiving one-bit data with a predetermined value from a higher-order controller, this signal supply controller stops the supply of driving source signals to the above driving circuit. The signal supply controller stops the supply of driving source signals when, for example, the disk drive is operated in a power-saving mode.

In the disk drives of the prior art described above, however, no measures were taken to avoid accidental landings due to abnormal operation of the spindle motor. In particular, if the head/slider was disposed over the disk (or over the data area) when the spindle motor stopped abnormally, an accidental landing was bound to occur. Abnormal stopping of the spindle motor might occur, for example, if one-bit data with the predetermined value was sent by mistake to the signal supply controller, due to a malfunction of the higher-order controller, stopping the supply of driving source signals even though the head/slider was disposed over the disk (or over the data area).

In a load/unload-type of disk drive, there is an additional risk that an accidental landing might occur if the head/slider is not loaded onto the disk at a predetermined velocity, so the head arm is driven with feedback control of the velocity of the actuator. Unloading also conforms to this driving method, except for power-off retract unloading when the power of the disk drive is switched off. If the disk drive receives a shock during loading or unloading with velocity control, however, the velocity of the actuator may depart greatly from the target value, and there is risk that an accidental landing might occur.

SUMMARY OF THE INVENTION

The present invention addresses these problems of the prior art, with the object of providing a head mechanism controller and signal supply controller capable of avoiding accidental head/slider landings on the disk surface.

To achieve the above object, when a head mechanism controller according to the present invention, during the loading of the head/slider, detects a shock that requires loading to be stopped, it stops loading and performs unloading.

When another head mechanism controller according to the present invention, during unloading with velocity control of the transducer head, detects a shock that requires velocity control to be stopped, it stops velocity-controlled driving, and causes unloading to be performed without control of the velocity of the actuator.

Another head mechanism controller according to the present invention confirms that the rotational speed of the recording medium is within a predetermined range, before allowing the transducer head to enter a predetermined area on the recording medium.

Another head mechanism controller according to the present invention causes the transducer head to withdraw from the predetermined area on the recording medium if the rotational speed of the recording medium departs from the predetermined range.

When the rotational speed setting of the recording medium is changed from a first rotational speed to a second rotational speed, another head mechanism controller according to the present invention causes an unloading of the transducer head to be performed, then causes the change of rotational velocity of the recording medium to be performed, and confirms that the rotational speed of the recording medium is within a predetermined range in relation to the second rotational speed before allowing a loading of the transducer head to be performed.

Another head mechanism controller according to the present invention resets a supervisory timer each time the recording medium makes a predetermined number of rotations, and causes a withdrawal of the transducer head to be performed, irrespective of the withdrawal control means, if the supervisory timer times out.

A signal supply controller according to the present invention stops the supply of driving source signals upon receiving a key signal.

A disk drive according to the present invention uses a head mechanism controller according to the present invention, or a signal supply controller according to the present invention.

BRIEF DESCRIPTION OF THE DRAWINGS

FIG. 4 is drawing showing examples of VCM current profiles during loading and unloading in a disk drive;

FIG. 5 is a drawing showing an example of a VCM current profile when loading is continued even though an external shock is received during loading in a disk drive;

FIG. 7 is a drawing showing a shock detector voltage profile and a VCM current profile when a shock is received during loading in the disk drive of embodiment 1 of the present invention;

DETAILED DESCRIPTION OF THE PREFERRED EMBODIMENT

Embodiment 1

Figure 1:
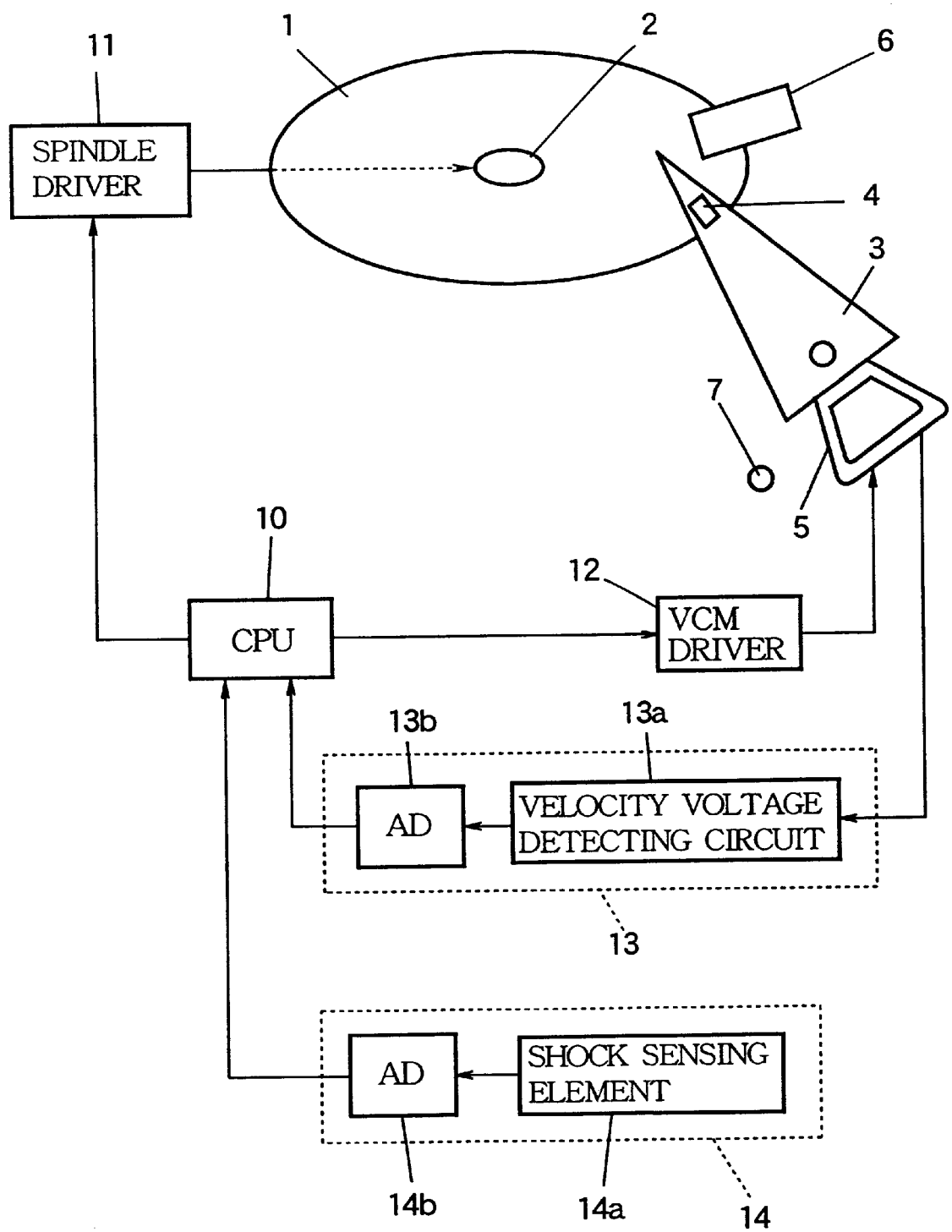
FIG. 1 is a drawing showing the configuration of the disk drive of embodiment 1 of the present invention.

FIG. 1 is a drawing showing the configuration of the disk drive of embodiment 1 of the present invention. The disk drive shown in FIG. 1 has a disk 1, a spindle 2 which is rotated by a spindle motor (not shown), an actuator 3, a head/slider 4, a VCM coil 5, a ramp 6, a crash stop 7, a CPU 10, a spindle driver 11, a VCM driver 12, an actuator velocity detecting circuit (or detector) 13, and a shock sensor 14.

The disk 1, which is the data recording medium, is secured to the spindle 2. The spindle motor rotates the disk 1. The head/slider 4, which has transducer heads that record data on the disk 1 and read data from the disk 1, and the VCM coil 5 are both mounted in the actuator 3. The VCM coil 5, together with a permanent magnet (not shown), constitutes a voice coil motor (VCM). This VCM swivels the actuator 3. The ramp 6 supports the head arm 3 when the head/slider 4 is unloaded and the actuator 3 is in the withdrawn position. The actuator, VCM, and ramp constitute a load/unload mechanism that loads the head/slider 4 onto the disk, and unloads it from the disk to the withdrawn position.

The spindle driver 11 drives the spindle motor according to commands from the CPU 10. The VCM driver 12 feeds driving current to the VCM coil 5 according to commands from the CPU 10, driving the actuator 3. The actuator velocity detecting circuit 13, which has a velocity voltage detecting circuit 13a and an AD converter 13b, detects the load/unload the actuator angular velocity. The shock sensor 14, which has a shock sensing element 14a and an AD converter 14b, senses shock received by the disk drive.

A feature of the disk drive of embodiment 1 is that if it senses shock with a predetermined level (threshold) or greater during the loading of the head/slider 4, it stops loading the head/slider 4 and performs unloading, then recommences loading after a delay. Another feature is that if it senses shock with a predetermined level or greater during the unloading of the head/slider 4 by velocity-controlled driving, it stops the velocity-controlled unloading and unloads the head/slider 4 by forced driving (driving without control of velocity).

The CPU 10, actuator velocity detecting circuit 13, and shock sensor 14 constitute a head mechanism controller that controls the above load/unload mechanism through the VCM driver 12. The CPU 10 has a first decision means that decides whether or not a shock sensed by the shock sensor 14 during loading of the head/slider 4 equals or exceeds a first threshold level, and a first load/unload control means that, if the shock equals or exceeds the first threshold level, causes loading to stop, causes unloading of the head/slider 4 to be performed, and causes loading to be performed again when unloading is finished. The CPU 10 also directs forced driving of the actuator 3, or directs velocity-controlled driving of the head arm 3 according to a load/unload velocity detected by the actuator velocity detecting circuit 13. In addition, the CPU 10 has a second decision means that decides whether or not a shock sensed by the shock sensor 14 during the unloading of the head/slider 4 by velocity-controlled driving equals or exceeds a second threshold level, and a second load/unload control means that, if the above shock equals or exceeds the second threshold level, causes velocity-controlled driving to be stopped, and causes unloading of the head/slider 4 to be performed by forced driving. The above means are based, for example, on program code stored in memory elements which may be in the CPU 10 and which is executed by the CPU. The CPU constitutes a spindle motor controller that controls the spindle motor through the spindle driver 11.

Figure 2A:
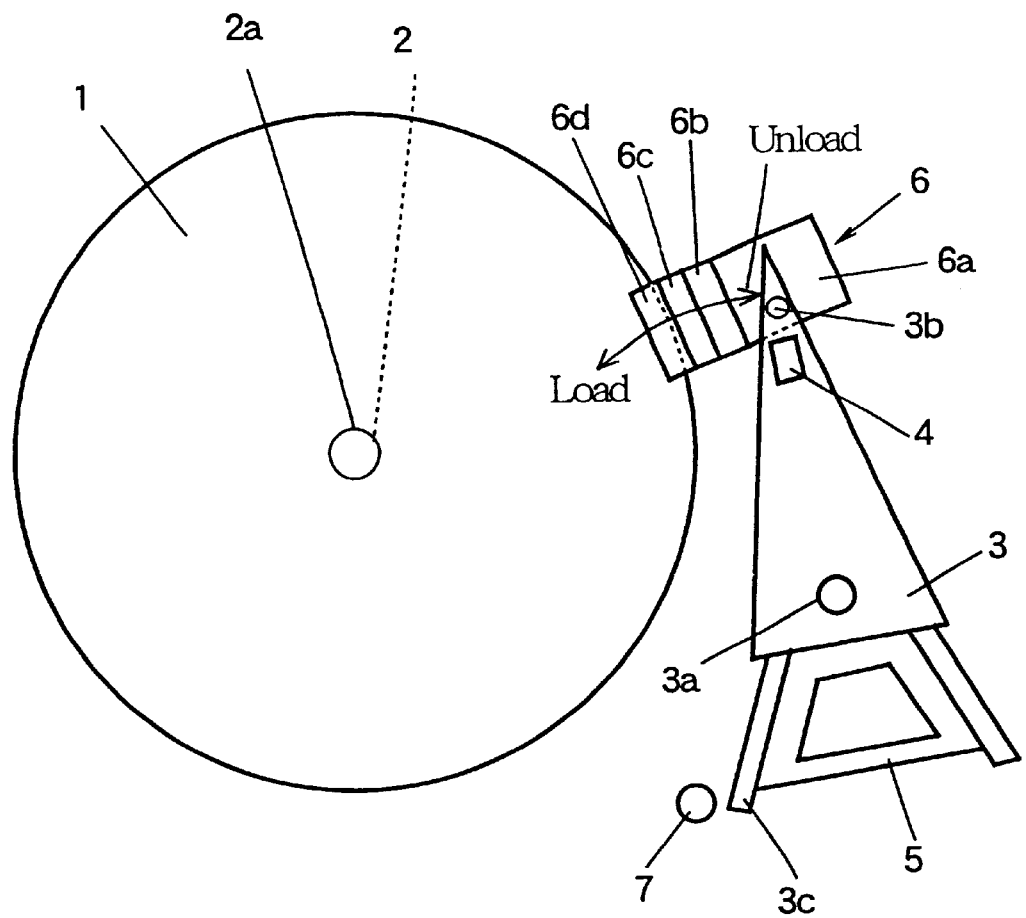
FIG. 2 is a drawing describing the loading and unloading of the head/slider in the disk drive of embodiment 1 of the present invention.
Figure 2B:
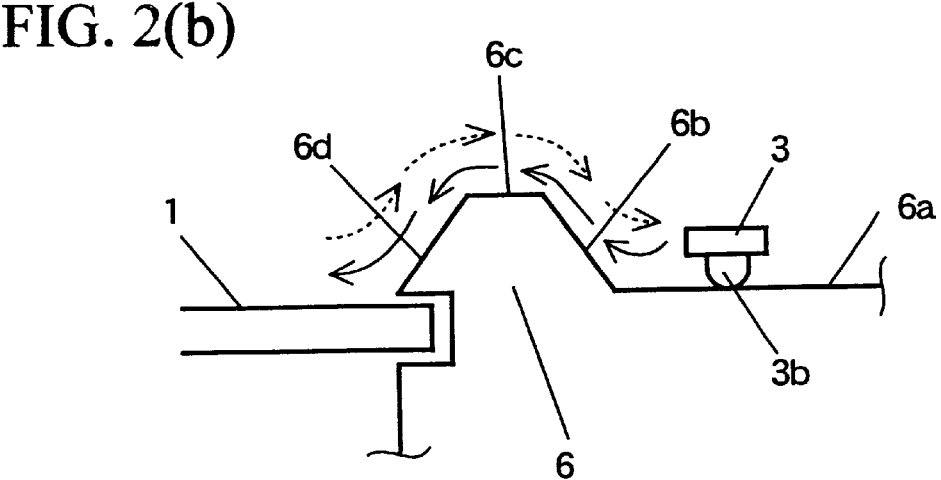

FIG. 2 is a drawing describing the loading and unloading of the head/slider 4: (a) is a top plan view; (b) is a sectional view, including the ramp 6 and a protrusion 3b formed in the actuator 3. The actuator 3 swivels around a swivel shaft 3a when driving current is fed to the VCM coil 5. In FIG. 2(a), the clockwise swiveling direction is the unload direction, and the counterclockwise swiveling direction is the load direction. When the head/slider 4 is unloaded and the actuator 3 is in the withdrawn position, the protrusion 3b formed in the actuator 3 makes contact with a parking surface 6a of the ramp 6. The coil supporting member 3c of the actuator 3 is also in contact with the crash stop 7, or very close.

When loading of the head/slider 4 is performed, the actuator 3 in FIG. 1 and FIG. 2 swivels in the above load direction, moving the head/slider 4 onto the rotating disk 1 (into the space over the disk 1). The protrusion 3b slides over the surface of the ramp 6 at this time, leaving from the inclined surface 6d. The position of the actuator 3 when the head/slider 4 is loaded is shown in FIG. 1. When unloading of the head/slider 4 is performed, the actuator 3 swivels in the unload direction, and the protrusion 3b slides over the surface of the ramp 6 in the unload direction, reaching the parking surface 6a (see FIG. 2).

Figure 3:
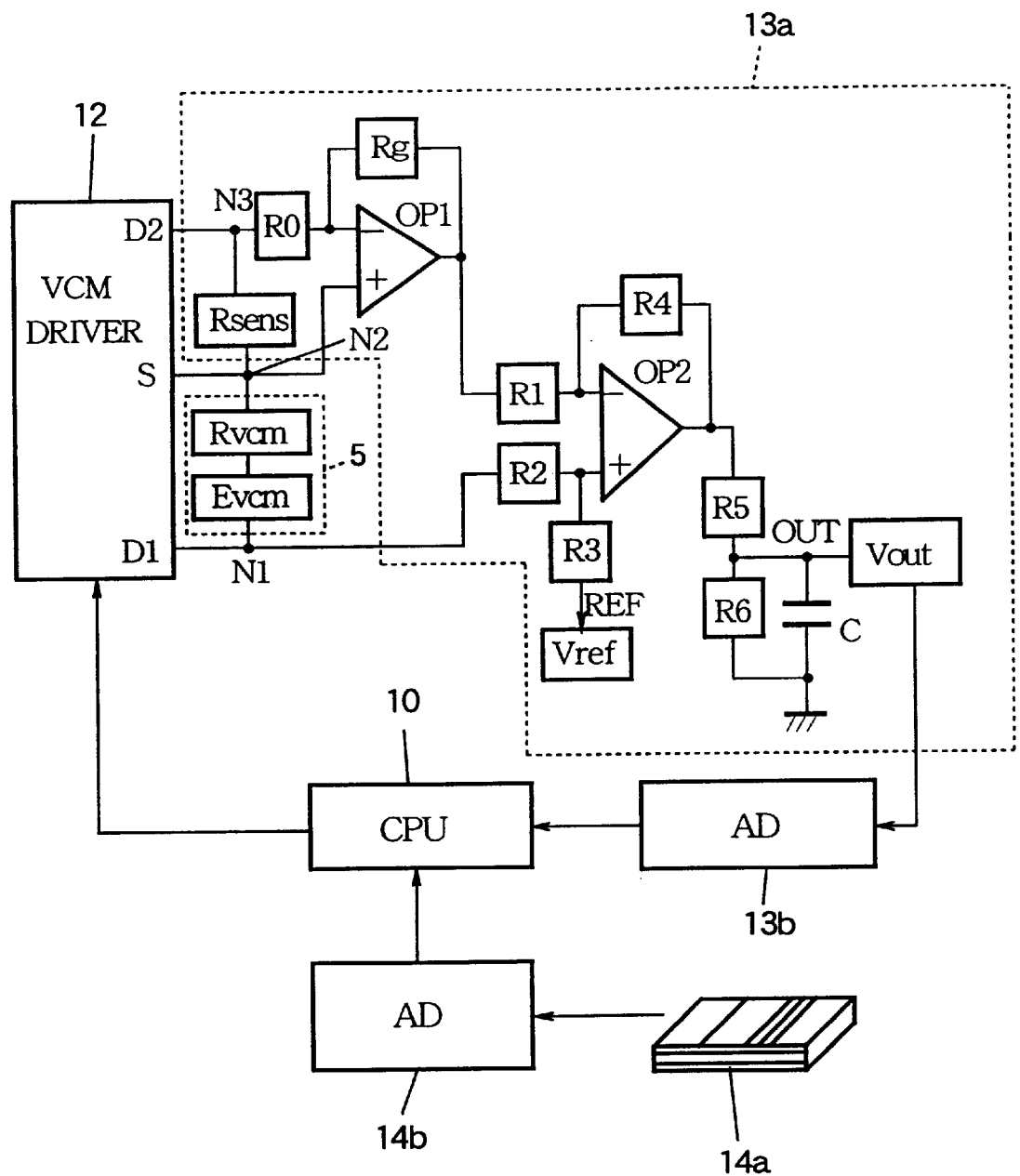
FIG. 3 is drawing showing the configuration of the head controller that controls the load/unload mechanism in the disk drive of embodiment 1 of the present invention.

FIG. 3 is a drawing showing the configuration of the head mechanism controller in the disk drive of embodiment 1.

The head mechanism controller shown in FIG. 3 comprises the CPU 10, actuator velocity voltage detecting circuit 13a, AD converter 13b, shock sensing element 14a, and AD converter 14b, as described above. In the VCM coil 5 in FIG. 3, Rvcm indicates the equivalent resistance of the coil, and Evcm indicates the counter-electromotive force generated in the coil when the coil moves. The actuator velocity voltage detecting circuit 13a is a circuit that outputs a voltage proportional to the counterelectromotive force Evcm of the VCM coil 5. The actuator velocity voltage detecting circuit 13a comprises, for example, resistors Rsens, R0, and Rg, a first differential section formed by an op-amp OP1, resistors R1 to R6, a capacitor C, a second differential section formed by an op-amp OP2, a REF terminal to which a reference voltage Vref is applied, and an OUT terminal. The VCM coil 5 is inserted between nodes N1 and N2, and resistor Rsens is inserted between nodes N2 and N3. Nodes N1, N2 and N3 are respectively connected to terminals D1, S, and D2 of the VCM driver 12. The driving current of the VCM coil 5 is supplied from the VCM driver 12, mainly by the following route:

terminal D1—VCM coil 5—resistor Rsens—terminal D2.

The voltage Vout at the OUT terminal is made proportional to the counter-electromotive force Evcm by setting values of resistors Rsens, R0, and Rg in relation to the coil resistance Rvcm so that Rvcm/Rsens=Rg/R0.

Since the magnitude of the counter-electromotive force Evcm is proportional to the angular velocity of the actuator 3, and thus to the velocity of the head/slider 4, the magnitude of the output voltage vout of the actuator velocity voltage detecting circuit 13a is proportional to the velocity of the head/slider 4. A voltage thus proportional to the velocity of the head/slider 4 is referred to as a velocity voltage. This velocity voltage Vout is converted to digital data by AD converter 13b, and input to the CPU 10.

The shock sensing element 14a is immovably mounted in the disk drive, and outputs a voltage (shock voltage) proportional to the magnitude of a shock. An acceleration sensor using a piezoelectric body (piezo-element), for example, is used as the shock sensing element 14a. The shock voltage output from the shock sensing element 14a is converted to digital data by AD converter 14b, and input to the CPU 10.

Velocity-controlled driving and forced driving in the loading and unloading of the head/slider 4 will now be explained. Velocity-controlled driving drives the actuator 3 so that the head velocity has a predetermined profile (or predetermined value); here, the actuator 3 will be driven at a constant velocity. In velocity-controlled driving, the CPU 10 controls the driving current value from the VCM driver 12 to the VCM coil 5 according to the head velocity detected by the actuator velocity detecting circuit 13. Forced driving drives the actuator 3 by feeding driving current with a predetermined profile (or predetermined value) to the VCM coil 5, regardless of the head velocity; here, a constant driving current is fed to the VCM coil to drive the actuator 3. The purpose of loading by velocity-controlled driving is to move the head/slider 4 onto the disk 1 with a predetermined velocity. Loading by velocity-controlled driving is essential in order to prevent accidental landing. The purpose of unloading by velocity-controlled driving is to have the actuator 3 contact the ramp 6 at a predetermined velocity.

FIG. 4 is a drawing showing an example of a profile of the driving current (VCM current) Ivcm fed to the VCM coil 5 in loading/unloading by velocity-controlled driving: (a) is a VCM current profile for loading; (b) is a VCM current profile for unloading. In FIG. 4(a), loading starts at time t0, and ends at time t1 by moving the head/slider 4 onto the disk 1 with a predetermined velocity. The profile of the VCM current Ivcm has a pulse current portion (the first push portion) P1, and a velocity-controlled current portion C1 that varies continuously. By means of the pulse current portion P1, the actuator 3 overcomes static friction with the parking surface 4a of the ramp 6 shown in FIG. 2, and starts sliding in the load direction; by means of the velocity-controlled current portion C1, it leaves the inclined surface 6d of the ramp 6 with a predetermined velocity, and moves onto the disk 1. The actuator 3 ascends the inclined surface 6b of the ramp 6 by means of C11 in the velocity-controlled current portion C1, slides over the plateau 6c by means of C12, and descends the inclined surface 6d by means of C13. In FIG. 4(b), the actuator 3 touches the ramp 6 at time t0, and unloading ends at time t1. The VCM current profile has a continuously varying velocity-controlled current portion C2 and a pulse current portion (last push portion) P2. The actuator 3 slides over the inclined surface 6d, plateau 6c, and inclined surface 6b of the ramp 6 by means of the velocity-controlled current portion C2, reaches the parking surface 6a, and is securely unloaded to the withdrawn position by means of the pulse current portion P2.

If an external shock is received during loading or unloading by velocity-controlled driving, it may become impossible to control the velocity of the actuator 3 normally, because of dynamic range limits of the AD converter 13b with respect to the velocity voltage, and other factors. If loading or unloading is continued after a shock is received, velocity control may become unstable, and the actuator 3 may move onto the disk 1 with an abnormal velocity, with the risk of an accidental landing. There is risk of an accidental landing during loading, for example, if the actuator 3 moves onto the disk 1 with a velocity exceeding that during normal velocity control. There is also a risk of accidental landing during unloading, if the actuator 3 moves back onto the disk 1.

FIG. 5 is a drawing showing an example of a VCM current profile when an external shock is received during loading by velocity-controlled driving, but loading is continued. In the VCM current profile in FIG. 5, the shock is received at time t2. The velocity-controlled current portion C3 shows a case in which velocity control is destabilized by a momentary change in head velocity due to the shock, and excessively high VCM current is fed to the VCM coil 5 from time t2 to time t1. There is risk at this time that the head/slider 4 will move onto the disk 1 with an abnormal velocity before time t1.

If the disk drive of embodiment 1 receives a shock while performing loading or unloading by velocity-controlled driving, however, it can avoid the above type of accidental landing by promptly performing unloading by forced driving.

Figure 6:
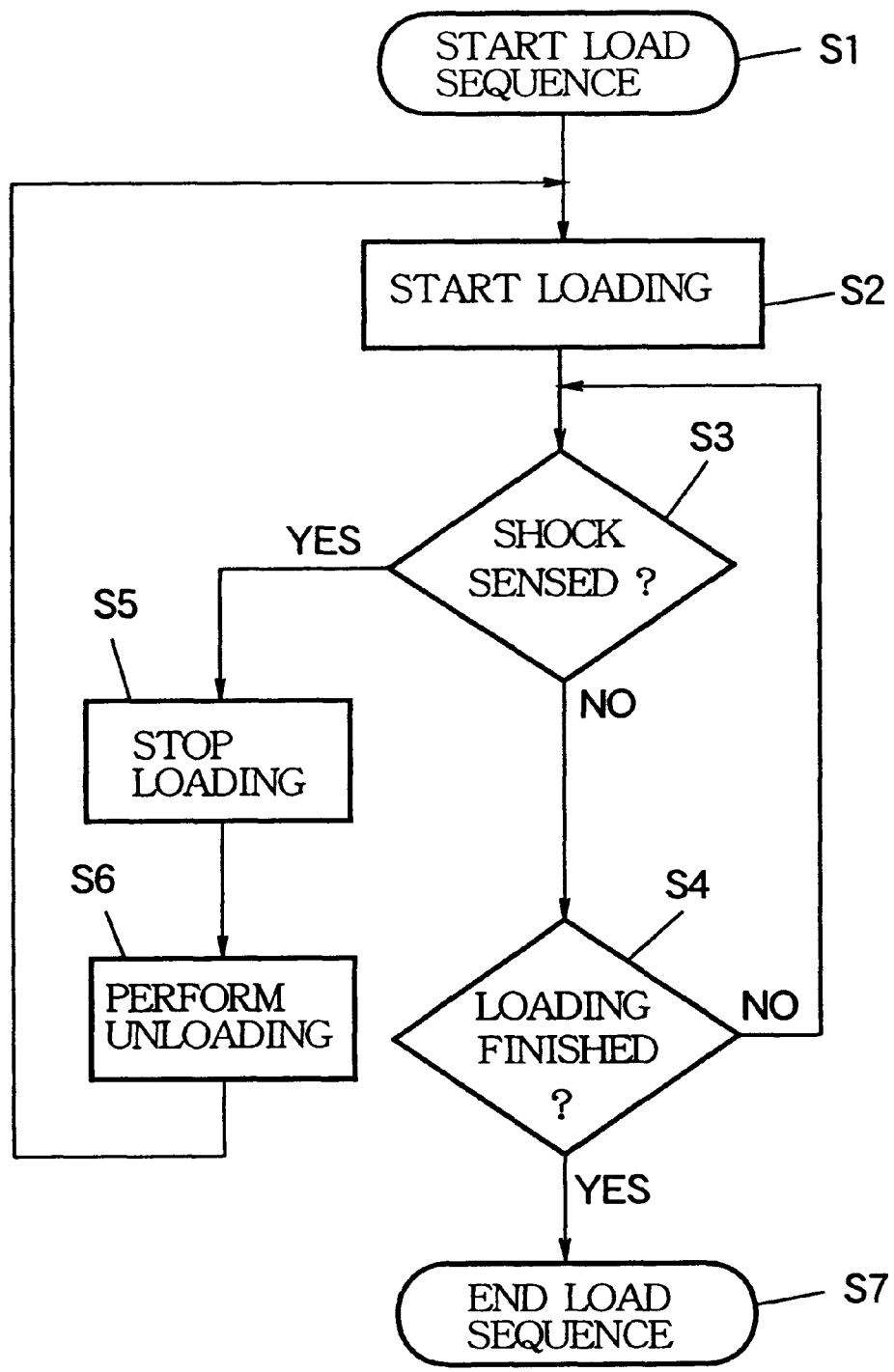
FIG. 6 is a flowchart showing the loading sequence in the disk drive of embodiment 1 of the present invention.

FIG. 6 is a flowchart showing the load sequence of the head/slider 4 in the disk drive of embodiment 1. When the load sequence starts in step S1, the CPU 10 commences loading of the head/slider 4 by velocity-controlled driving in step S2, by means of a control loop comprising the VCM driver 12, VCM coil 5, and actuator velocity detecting circuit 13.

During loading, in step S3 the first decision means in the CPU 10 decides whether or not a shock that requires loading to be stopped has been received, by comparing the shock voltage from the shock sensor 14 with the first threshold level. If the decision in step S3 is that a shock requiring loading to be stopped has not been received, in step S4 the CPU 10 decides whether or not loading is finished, and returns to step S3 if loading is not finished, or proceeds to step S7, completing the load sequence, if loading is finished.

If the decision in step S3 is that a shock requiring loading to be stopped has been received, the first load/unload control means in the CPU 10 stops loading in step S5, causes unloading to be performed by forced driving in step S6, and returns the actuator 3 to the withdrawn position. When the unloading in step S6 ends, a return is made to step S2, and the first load/unload control means commences reloading.

FIG. 7 is a drawing showing examples of a profile of the shock voltage Vsh of the shock sensing element 14*b* and a VCM current profile when a shock is received during loading by velocity-controlled driving in the disk drive of embodiment 1: (a) is the shock voltage profile, and (b) is the VCM current profile. The disk drive starts loading the actuator 3 at time t0, stops loading at time t2 because an external shock is received, performs an emergency unloading from time t2 to time t3, starts loading again at time t3, and finishes loading at time t4. The VCM current profile shown in FIG. 7(*b*) has a pulse current portion P3, a velocity-controlled current portion C4, a constant-current portion J, pulse current portions P4 and P5, and a velocity-controlled portion C5. Pulse current portions P3 and P5 are the same as pulse current portion P1 in FIG. 4(*a*); pulse current portion P4 is the same as pulse current portion P2 in FIG. 4(*b*). The velocity-controlled current portion C5 is substantially the same as velocity-controlled current portion C1 in FIG. 4(*a*).

The level of the shock voltage at time t2 shown in FIG. 7(*a*) is greater than the first threshold level Vt1, so unloading of the head/slider 4 is performed by forced driving (see steps S3, S5, and S6 in FIG. 6). The resulting driving current is the constant-current portion J, which has reverse polarity to the velocity-controlled current portion C4, as shown in FIG. 7(*b*). Due to the constant-current portion J, the actuator 3, which was sliding over the surface of the ramp 6 in the load direction due to the velocity-controlled current portion C4, reverses its sliding direction and returns to the withdrawn position at time t3. From time t3 to time t4, the head/slider 4 is loaded onto the disk 1 by the pulse current portion P5 and velocity-controlled current portion C5.

Figure 8:
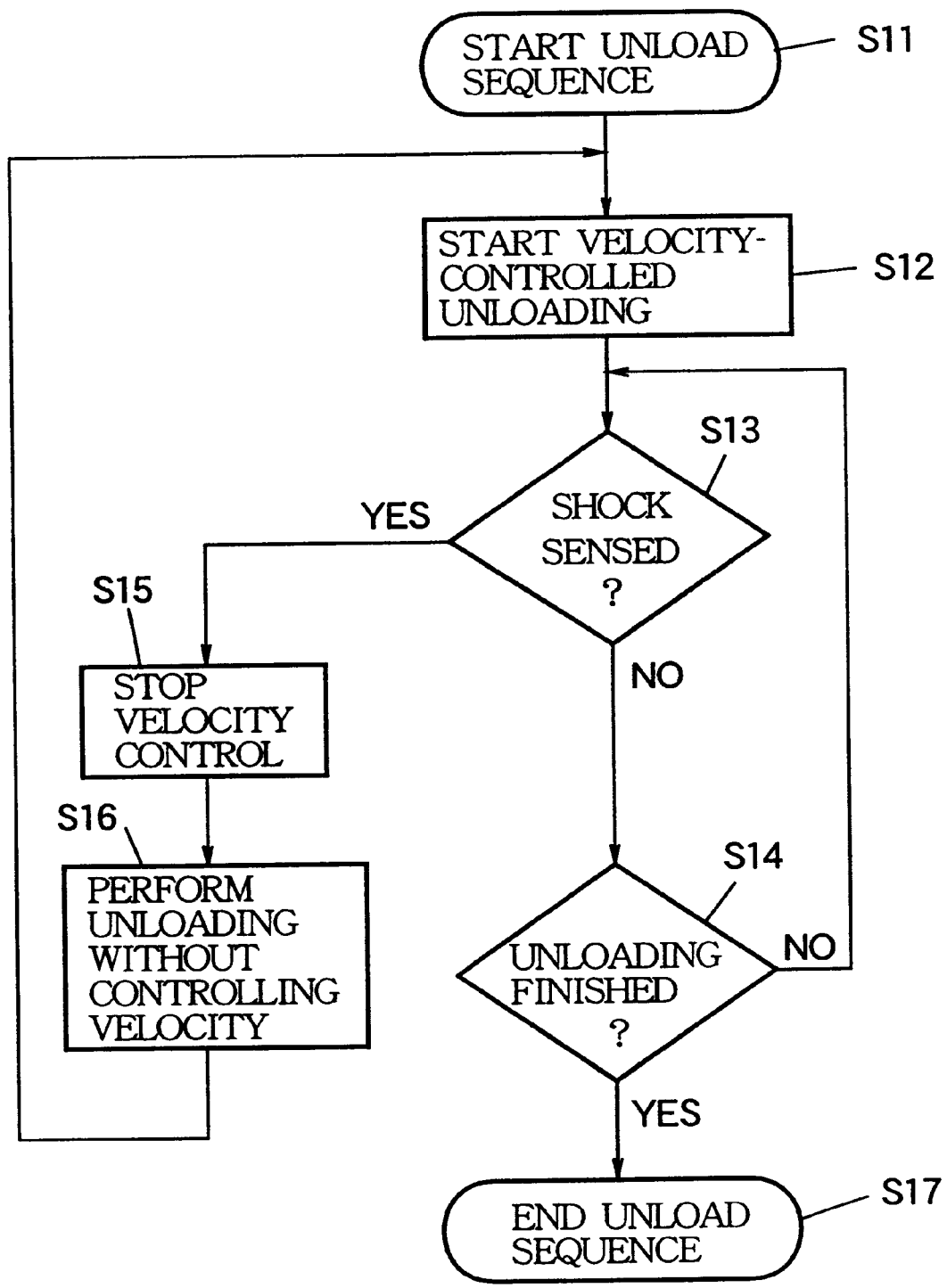
FIG. 8 is a flowchart showing the unloading sequence in the disk drive of embodiment 1 of the present invention.

FIG. 8 is a flowchart showing the unload sequence of the head/slider 4 in the disk drive of embodiment 1. When the unload sequence starts in step S11, unloading by velocity-controlled driving also starts in step S12. During this unloading, in step S13 the second decision means in the CPU 10 decides whether or not a shock that requires velocity-controlled driving to be stopped has been received, by comparing the shock voltage from the shock sensor 14 with the second threshold level. If the decision in step S13 is that a shock requiring velocity-controlled driving to be stopped has not been received, in step S14 the CPU 10 decides whether or not unloading is finished, and proceeds to step S17, completing the load sequence, if unloading is finished.

If the decision in step S13 is that a shock requiring velocity-controlled driving to be stopped has been received, the second load/unload control means in the CPU 10 stops velocity-controlled driving in step S15, causes unloading to be performed by forced driving in step S16, returns the actuator 3 to the withdrawn position, and completes the unload sequence in step S17.

According to this type of embodiment 1, if a shock is sensed during loading of the head/slider 4, the loading is stopped, unloading is performed, and when the unloading is finished, reloading is performed; or if a shock is sensed during unloading by velocity-controlled driving, the velocity-controlled driving is stopped, and unloading of the head/slider 4 by driving without control of velocity is performed; whereby accidental landings can be prevented even if a shock is received during loading or unloading.

Optionally, a counter which tracks a number of aborted attempts in a selected time period can be included and if loading has been aborted a predetermined number of times due to shock sensing, the drive may stop trying to load the heads. The program code executed by the CPU may be used for ending attempts to load if the number of aborted attempts has reached a predetermined number. It is also permissible to decide whether or not loading must be stopped or velocity-controlled driving must be stopped by considering the position of the head/slider 4 on the ramp 6 when the shock is received, and other factors, in addition to the level of the shock.

Embodiment 2

Figure 9:
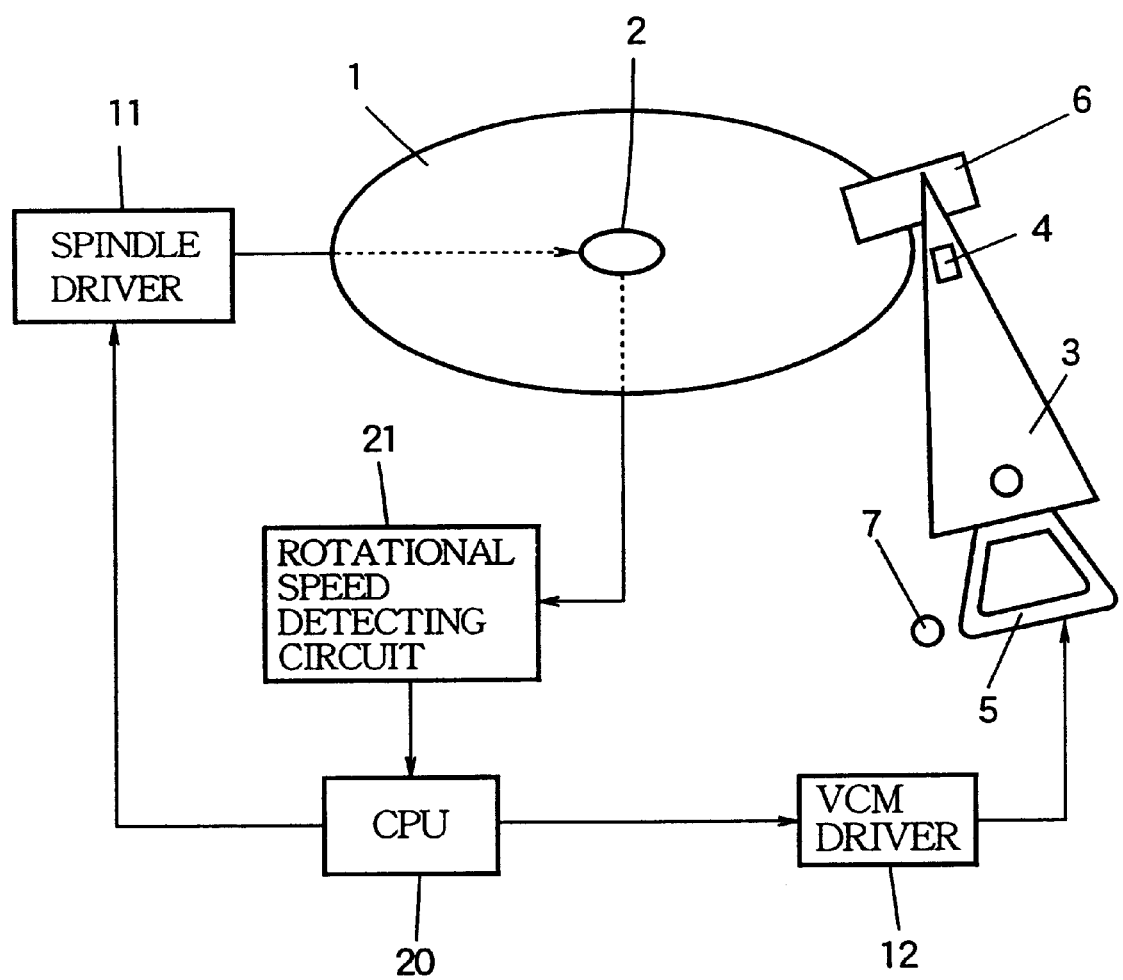
FIG. 9 is a drawing showing the configuration of the disk drive of embodiment 2 of the present invention.

FIG. 9 is a drawing showing the configuration of the disk drive of embodiment 2 of the present invention. The disk drive shown in FIG. 9 has a disk 1, a spindle 2, a spindle motor (not shown), an actuator 3, a head/slider 4, a VCM coil 5, a ramp 6, a crash stop 7, a CPU 20, a spindle driver 11, a VCM driver 12, and a rotational speed detecting circuit 21. Elements in FIG. 9 that are the same as in FIG. 1 have the same reference numerals.

A feature of the disk drive of embodiment 2 is that it confirms that the rotational speed of the spindle motor is within a predetermined tolerance range in relation to a speed setting before performing the loading of the head/slider 4. An abnormal rotational speed of the spindle motor (a speed outside the tolerance range) contains the possibility of abnormal stopping of the spindle motor. Abnormal stopping of the spindle motor during loading of the actuator always invites accidental landing. An abnormal rotational speed of the spindle motor during loading of the actuator also risks inviting an accidental landing. Accidental landings due to abnormalities of the spindle motor during loading can be prevented by checking whether the rotational speed of the spindle motor is or is not normal before allowing loading of the head/slider 4 to be performed, and allowing the loading to be performed only if the rotational speed is normal.

On command from the CPU 20, the rotational speed detecting circuit 21 detects the rotational speed of the spindle motor, and sends the detected value to the CPU 20. The CPU 20 and rotational speed detecting circuit 21 constitute a head mechanism controller that controls the load/unload mechanism through the VCM driver 12. The CPU 20 has a decision means that decides whether or not the rotational speed detected by the rotational speed detecting circuit 21 is within a predetermined tolerance range in relation to a rotational speed setting, and an entry control means that allows loading of the head/slider 4 to be performed only if the detected rotational speed is within the tolerance range. The tolerance range is, for example, +/−0.3% of a rotational speed setting of 4000 rpm. The above means are based, for example, on program code stored in memory elements in the CPU 20. The CPU 20 also constitutes a spindle motor controller that controls the spindle motor through the spindle driver 11.

Figure 10:
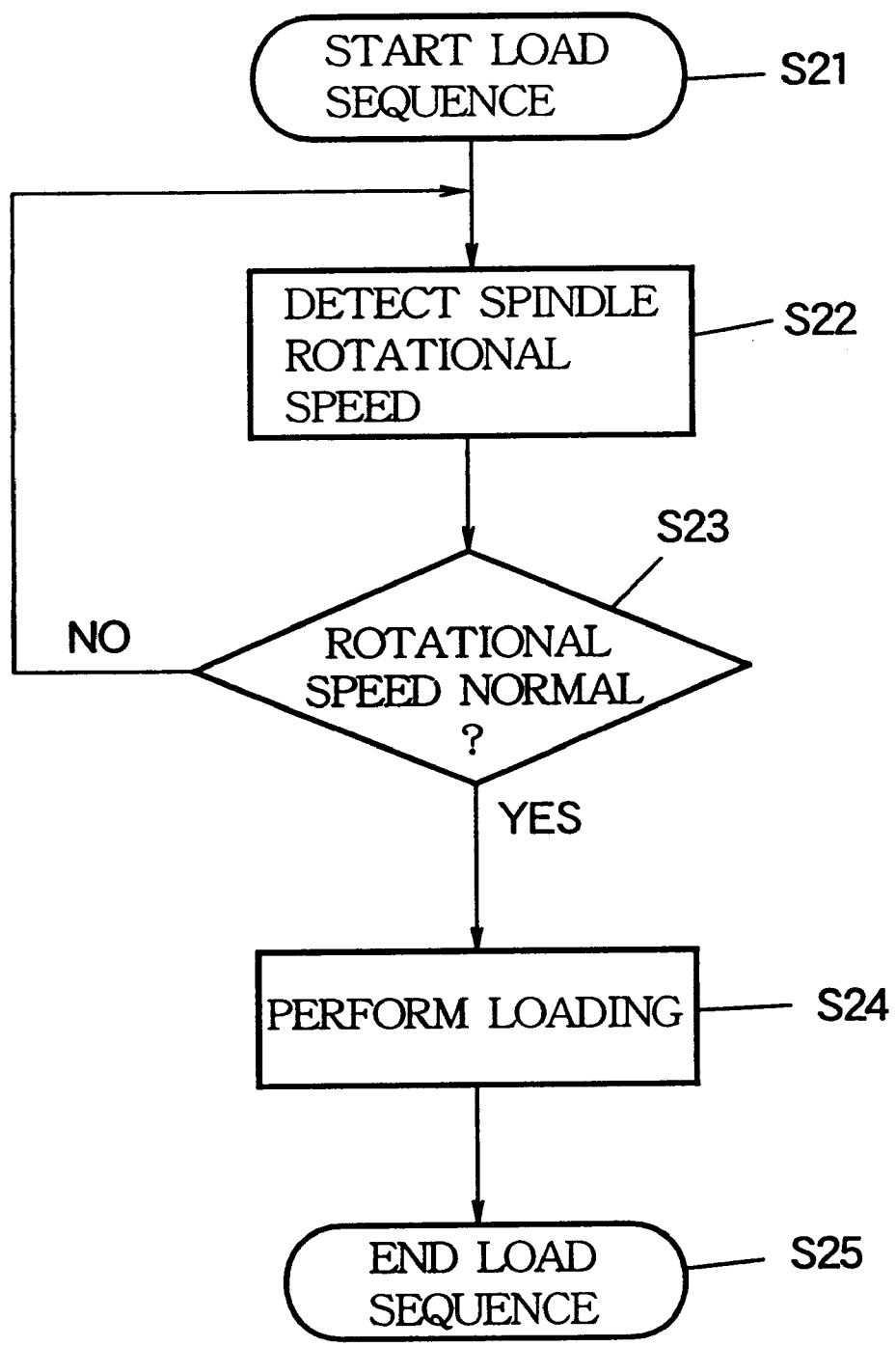
FIG. 10 is a flowchart showing the loading sequence in the disk drive of embodiment 2 of the present invention.

FIG. 10 is a flowchart showing the load sequence of the head/slider 4 in the disk drive shown in FIG. 9. When the load sequence starts in step S21, first the rotational speed of the spindle motor is detected by the rotational speed detecting circuit 21 in step S22. Next, in step S23, the decision means in the CPU 20 decides whether or not the detected spindle rotational speed is within the tolerance range; if the spindle motor is turning normally and the spindle rotational speed is within the tolerance range in step S23, then the entry control means in the CPU 20 causes the loading of the head/slider 4 to be performed in step S24, and the load sequence ends in step S25. The loading in step S24 is performed by, for example, the velocity-controlled driving described in embodiment 1 above.

If the spindle motor is not turning normally and the spindle rotational speed is not within the tolerance range in step S23, a return is made to step S22. The loop comprising steps S22 and S23 is repeated, without loading being performed, until it is confirmed that the spindle motor is turning normally.

Thus according to embodiment 2, accidental landings due to abnormalities of the spindle motor during loading can be prevented by confirming that the rotational speed of the spindle motor is normal before allowing the loading of the head/slider 4 to be performed.

It is permissible to stop the load sequence when the loop comprising steps S22 and S23 in FIG. 10 has been repeated a predetermined number of times, or for a predetermined time. Moreover, the head mechanism controller in embodiment 2 above can also be employed in CSS-type disk drives.

Embodiment 3

The configuration of the disk drive of embodiment 3 of the present invention has a CPU 30 replacing the CPU 20 in the disk drive of the above embodiment 2, shown in FIG. 9.

A feature of the disk drive of embodiment 3 is that when the head/slider 4 has been loaded and operations such as the reading or writing of data are being performed, if the rotational speed of the spindle motor departs from a predetermined tolerance range in relation to a rotational speed setting, an unloading of the head/slider 4 is performed. An abnormal rotational speed of the spindle motor (a speed outside the tolerance range) contains the possibility of abnormal stopping by the spindle motor. Abnormal stopping of the spindle motor while operations are being performed (when the head/slider 4 is positioned over the disk 1) always invites accidental landing. Abnormal rotational speed of the spindle motor while operations are being performed also risks inviting an accidental landing. Accidental landings due to abnormalities of the spindle motor while operations are being performed can be prevented by causing unloading of the head/slider 4 to be performed if the rotational speed of the spindle motor departs from the tolerance range.

The CPU 30 and rotational speed detecting circuit 21 constitute a head mechanism controller that controls the load/unload mechanism through the VCM driver 12. The CPU 30 has a decision means that decides whether or not the rotational speed detected by the rotational speed detecting circuit 21 is outside a predetermined tolerance range in relation to a rotational speed setting, and a withdrawal control means that causes an unloading of the head/slider 4 to be performed if the detected rotational speed is outside the tolerance range. The tolerance range is, for example, +/−0.6% of a rotational speed setting of 4000 rpm. The above means are based, for example, on program code stored in memory elements in the CPU 30. The CPU 30 also constitutes a spindle motor controller that controls the spindle motor through the spindle driver 11.

Figure 11:
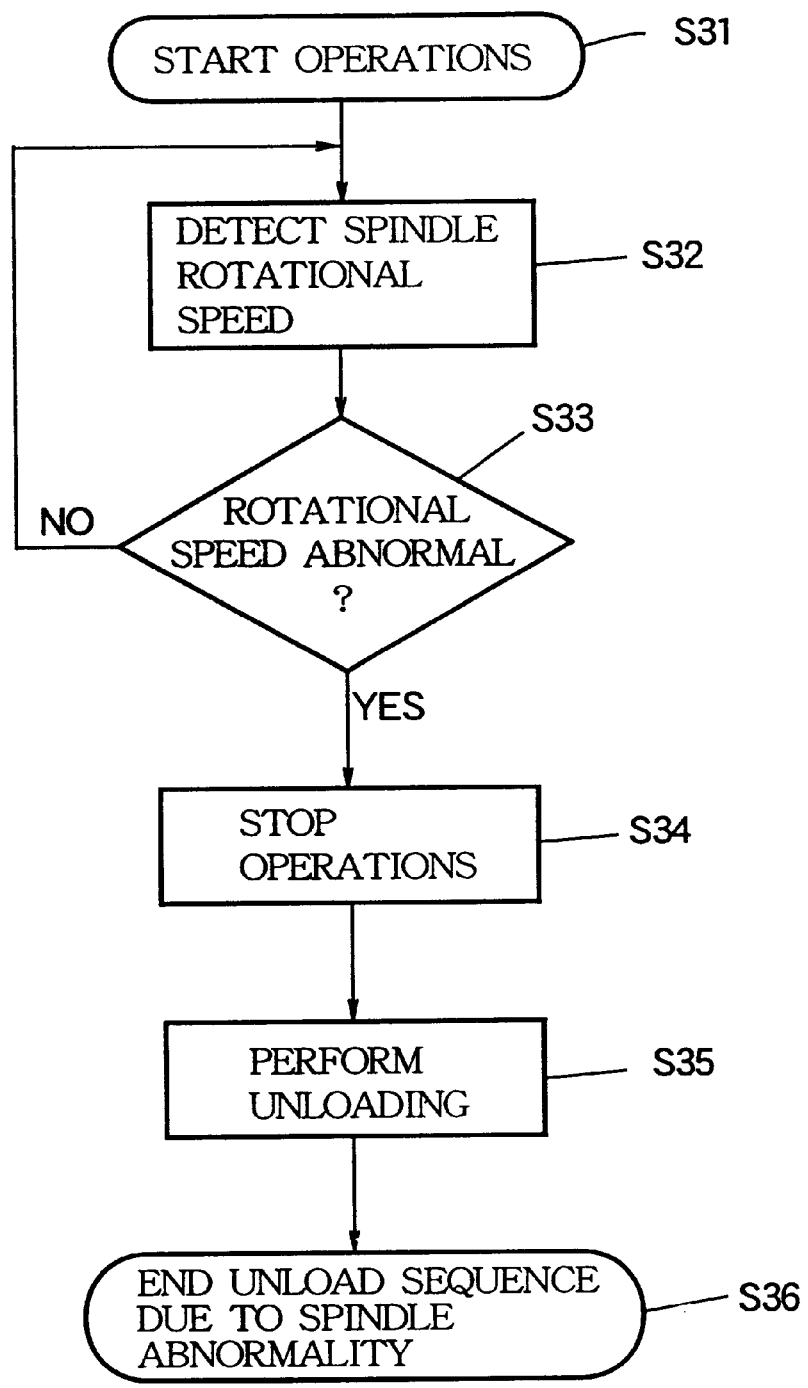
FIG. 11 is a flowchart showing the unloading sequence due to a spindle rotational speed abnormality in the disk drive of embodiment 3 of the present invention.

FIG. 11 is a flowchart showing the unload sequence due to a spindle rotational speed abnormality in the disk drive of embodiment 3. When the head/slider 4 is loaded and operations begin in step S31, the rotational speed of the spindle motor is detected by the rotational speed detecting circuit 21 in step S32; in step S33, the decision means in the CPU 30 decides whether or not the detected spindle rotational speed is outside the tolerance range, and returns to step S32 if it is within the tolerance range. While operations are being performed, the spindle rotational speed is thus monitored continuously by the loop comprising steps S32 and S33.

If the spindle rotational speed is outside the tolerance range in step S33, then in step S34, the CPU 30 stops the operations; in step S35, the withdrawal control means in the CPU 30 causes an unloading of the head/slider 4 to be performed; and the unload sequence due to the spindle rotational speed abnormality ends in step S36. Either unloading by velocity-controlled driving or unloading by forced driving can be used for the unloading in step S35.

Thus according to embodiment 3, accidental landings due to abnormalities of the spindle motor while operations are being performed can be prevented by causing an unloading of the head/slider 4 to be performed if the rotational speed of the spindle motor departs from the tolerance range while operations are being performed.

The head mechanism controller in embodiment 3 above can also be employed in CSS-type disk drives.

Embodiment 4

The configuration of the disk drive of embodiment 4 of the present invention has a CPU 40 replacing the CPU 20 in the disk drive of the above embodiment 2, shown in FIG. 9.

A feature of the disk drive of embodiment 4 is that when changing the spindle rotational speed, it unloads the head/slider 4 before performing the change of the spindle rotational speed, then confirms that the spindle rotational speed has stabilized at the new rotational speed setting (is within a predetermined tolerance range in relation to the new rotational speed setting) before loading the head/slider 4 again. Changing the rotational speed of the spindle motor contains a substantial possibility of rotational speed abnormalities, or of abnormal stopping of the spindle motor. If the head/slider 4 is positioned over the disk 1 when the spindle rotational speed is changed, there is a substantial risk of bringing about an accidental landing. Accidental landings when the spindle rotational speed is changed can be prevented by unloading the head/slider 4 when the spindle rotational speed is changed, and loading the head/slider 4 after the spindle rotational speed has stabilized at the new rotational speed setting.

Changes of the spindle rotational speed are performed in transitions to low-rpm burnishing and low-rpm operations such as low-rpm reading, or on return from low-rpm operations to operations at the normal rotational speed. Low-rpm burnishing is a process in which the spindle rotational speed is reduced below normal, reducing the flying height of the head/slider 4, and projections from the surface of the disk 1 are removed by means of the head/slider 4. A low-rpm operation is a process of reducing the flying height of the head/slider 4 and reading or writing data.

The CPU 40 and rotational speed detecting circuit 21 constitute a head mechanism controller that controls the load/unload mechanism through the VCM driver 12. The CPU 40 is characterized in having a withdrawal control means that causes unloading of the head/slider 4 to be performed if notification that a rotational speed change of the rotational speed setting of the spindle motor from a first rotational speed (normal rotational speed) to a second rotational speed (low-rpm) will be performed is received from a higher-order controller of the CPU 40, or from another means in the CPU 40; a rotational speed change control means that causes the change of the rotational speed setting of the spindle motor to be performed; a decision means that decides whether or not the rotational speed detected by the rotational speed detecting circuit 21 is outside a predetermined tolerance range in relation to the second rotational speed; and an entry control means that causes loading of the head/slider 4 to be performed if the detected rotational speed is within the tolerance range. The tolerance range is, for example, +/−0.3% of the second rotational speed, which is 3000 rpm. The above means are based, for example, on program code stored in memory elements in the CPU 40. The CPU 40 also constitutes a spindle motor controller that controls the spindle motor through the spindle driver 11. The above rotational speed change control means causes the change of the spindle rotational speed to be performed by the spindle motor controller.

Figure 12:
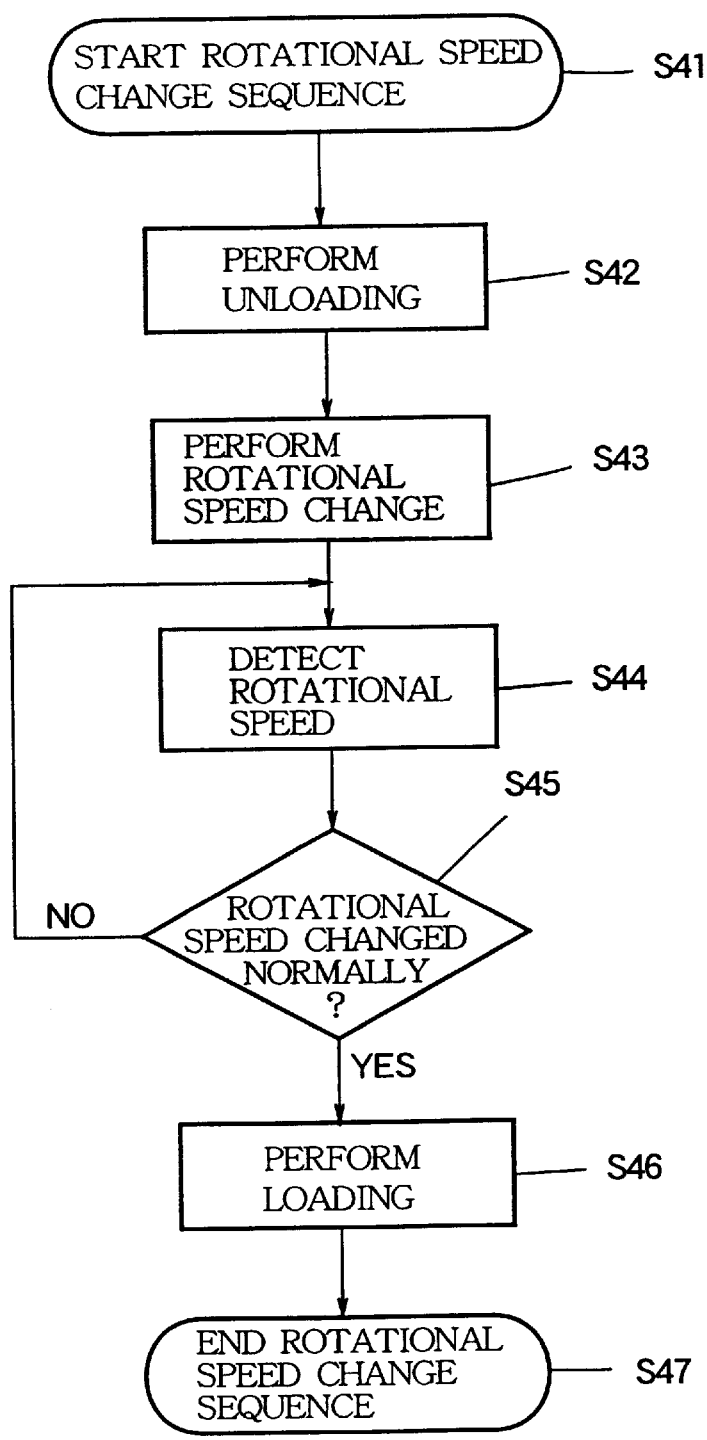
FIG. 12 is a flowchart showing the spindle rotational speed change sequence in the disk drive of embodiment 4 of the present invention.

FIG. 12 is a flowchart showing the spindle rotational speed change sequence in the disk drive of embodiment 4. The sequence shown in FIG. 12 can be employed either when the spindle rotational speed is reduced (for example, in a transition from operations at the normal rotational speed to low-rpm operations), or when the spindle rotational speed is increased (for example, in a transition from low-rpm operations to operations at the normal rotational speed).

When normal-rotational-speed operations are terminated in step S41 in accordance with a notification of a change of the spindle rotational speed, and the spindle rotational speed change sequence begins, first, the withdrawal control means in the CPU 40 performs an unloading of the head/slider 4 in step S42. This unloading may be either unloading by velocity-controlled driving or unloading by forced driving.

Next, in step S43, the rotational speed change control means in the CPU 40 causes the change of the spindle rotational speed to be performed by the spindle motor controller. The rotational speed of the spindle motor thereby changes from the first rotational speed toward the second rotational speed.

Next, in step S44, the CPU 40 detects the rotational speed of the spindle motor by means of the rotational speed detecting circuit 21; in step S45, the decision means in the CPU 40 decides whether or not the detected rotational speed is within the tolerance range in relation to the second rotational speed, and returns to step S44 if the detected rotational speed has not been changed normally and is outside the tolerance range. The loop comprising steps S44 and S45 is accordingly repeated until it is confirmed that the rotational speed of the spindle motor has been changed normally.

If, in step S45, it is confirmed that the rotational speed of the spindle motor has been changed normally and the spindle rotational speed is within the tolerance range, then in step S46, the entry control means in the CPU 40 causes loading of the head/slider 4 to be performed. The spindle rotational speed change sequence is completed in step S47, when the loading of the head/slider 4 ends, and a transition is made, for example, to low-rpm operations.

Thus according to embodiment 4, when the spindle rotational speed is changed, accidental landings due to abnormalities of the spindle motor when the rotational speed is changed can be prevented by unloading the head/slider 4 before performing the change of the spindle rotational speed, and confirming that the spindle rotational speed has stabilized at the new rotational speed setting before loading the head/slider 4 again.

The head mechanism controller in embodiment 4 above can also be employed in CSS-type disk drives.

Embodiment 5

Figure 13:
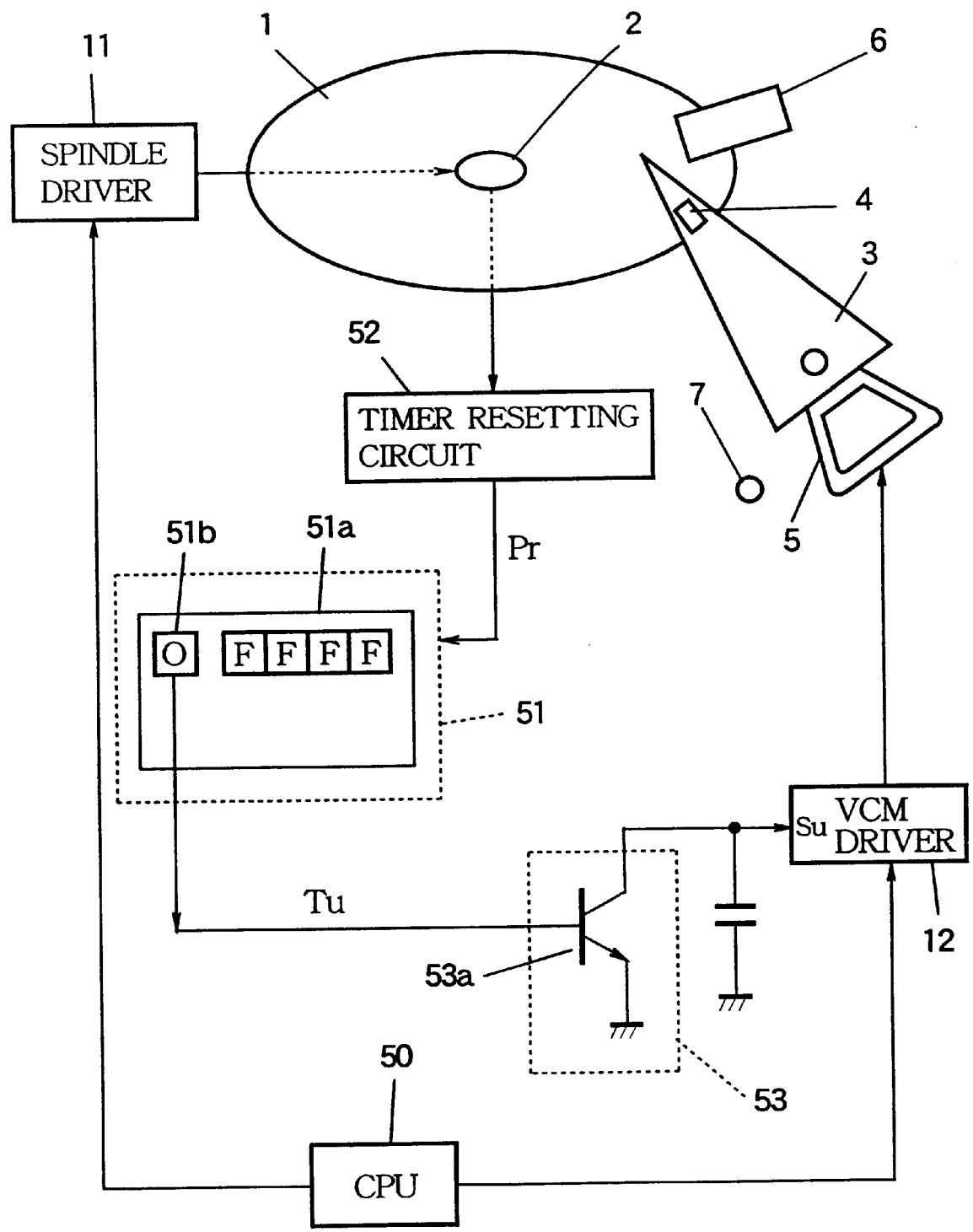
FIG. 13 is a drawing showing the configuration of the disk drive of embodiment 5 of the present invention.

FIG. 13 is a drawing showing the configuration of the disk drive of embodiment 5 of the present invention. The disk drive shown in FIG. 13 has a disk 1, a spindle motor, an actuator 3, a head/slider 4, a VCM coil 5, a ramp 6, a crash stop 7, a CPU 50, a spindle driver 11, a VCM driver 12, a supervisory timer 51, a timer resetting circuit 52, and a withdrawal control auxiliary circuit 53. Elements in FIG. 13 that are the same as in FIG. 1 have the same reference numerals.

The supervisory timer 51 has a counter circuit 51*a* that increments, for example, at fixed time intervals, is reset by a reset pulse Pr, and upon overflowing, outputs a time-up signal Tu at the "H" level. This counter 51*a* is, for example, a 16-bit counter circuit having a 1-bit overflow bit 51*b*, as shown in FIG. 13. The bit value of the overflow bit 51*b* becomes the time-up signal Tu. When the counter circuit 51*a* overflows, the overflow bit 51*b* changes from "0" to "1" (from the "L" level to the "H" level). The timer resetting circuit 52 outputs a reset pulse Pr each time the disk 1 makes a predetermined number of rotations, and has, for example, a circuit that detects one rotation of the disk 1, a counter circuit that increments each time one rotation of the disk 1 is detected, and a circuit that outputs the reset pulse Pr when the counter output reaches a predetermined value, also resetting the counter circuit. The withdrawal control auxiliary circuit 53 has, for example, a transistor 53*a* that turns on when the time-up signal Tu is at the "H" level. The time-up signal Tu is input to the base terminal of transistor 53*a*, the emitter terminal of transistor 53*a* is grounded, and the collector terminal is connected to the Su terminal of the VCM driver 12. The VCM driver 12 performs an unloading of the head/slider 4 when the Su terminal is grounded.

The CPU 50, supervisory timer 51, timer resetting circuit 52, and withdrawal control auxiliary circuit 53 constitute a head mechanism controller that controls the load/unload mechanism through the VCM driver 12. The CPU 50 also constitutes a spindle motor controller that controls the spindle motor through the spindle driver 11. The CPU 50 has an entry/withdrawal control means, belonging to the head mechanism controller, for causing loading/unloading to be performed, and a rotation control means, belonging to the spindle motor controller, for causing the spindle motor to be driven. These means are based on program code stored in the CPU 50.

Accidental landings are apt to occur if, due to program-code misbehavior or the like in the CPU 50, the above program-code-based entry/withdrawal control means and rotation control means fail to operate normally, and stop the spindle motor even though the head/slider 4 is positioned over the disk 1; or if the withdrawal means in embodiment 3 or 4 above does not operate normally.

A feature of the disk drive of embodiment 5 is that it supervises the spindle rotational speed by means of the supervisory timer 51 and timer resetting circuit 52, and performs an unloading of the head/slider 4 by means of the withdrawal control auxiliary circuit 53, irrespective of the program-code-based means, if the spindle rotational speed drops abnormally. Even if the program-code-based means malfunction, accidental landings can be prevented by performing an unloading, irrespective of the program-code-based means, when the spindle rotational speed drops.

Next, the operation of the head mechanism controller in the disk drive of embodiment 5 will be described. When the disk 1 is being rotated at a normal rotational speed by the spindle motor, the timer resetting circuit 52 outputs reset pulses Pr at shorter time intervals than those at which the supervisory timer 51 times up. The overflow bit 51b of the supervisory timer 51 is therefore always at the "L" level, and the transistor 53a in the withdrawal control auxiliary circuit 53 is always off.

If the spindle rotational speed drops abnormally, the time interval between reset pulses Pr from the timer resetting circuit 52 lengthens; if the supervisory timer 51 times out, then the overflow bit 51b, namely the time-out signal Tu, changes from the "L" level to the "H" level. When the time-up signal Tu changes to the "H" level, transistor 53a turns on, the Su terminal of the VCM driver 12 is grounded, and the VCM driver 12 is reset. The VCM driver 12 thereupon activates a retract circuit, not shown in the drawing, causing the retract circuit to perform the unloading of the head/slider 4. The above retract circuit is a circuit known in the prior art that generates driving current from the counter-electromotive force generated by the spindle motor for feeding to the VCM coil 5. Even if the entry/withdrawal control means in this head mechanism controller and the rotation control means in the spindle motor controller fail to operate normally, due to program-code misbehavior or the like, and stop the spindle motor while the head/slider 4 is positioned over the disk 1, the head/slider 4 will be unloaded by the supervisory timer 51, timer resetting circuit 52, and withdrawal control auxiliary circuit 53 before the spindle motor halts.

Thus according to embodiment 5, accidental landings can be prevented even if the program-code-based means malfunction, by supervision of the spindle rotational speed by the supervisory timer 51 and timer resetting circuit 52, and by having an unloading of the head/slider 4 performed by the withdrawal control auxiliary circuit 53 when the spindle rotational speed drops abnormally, irrespective of the program-code-based means.

The head mechanism controller in embodiment 5 above can also be employed in CSS-type disk drives.

Embodiment 6

Figure 14:
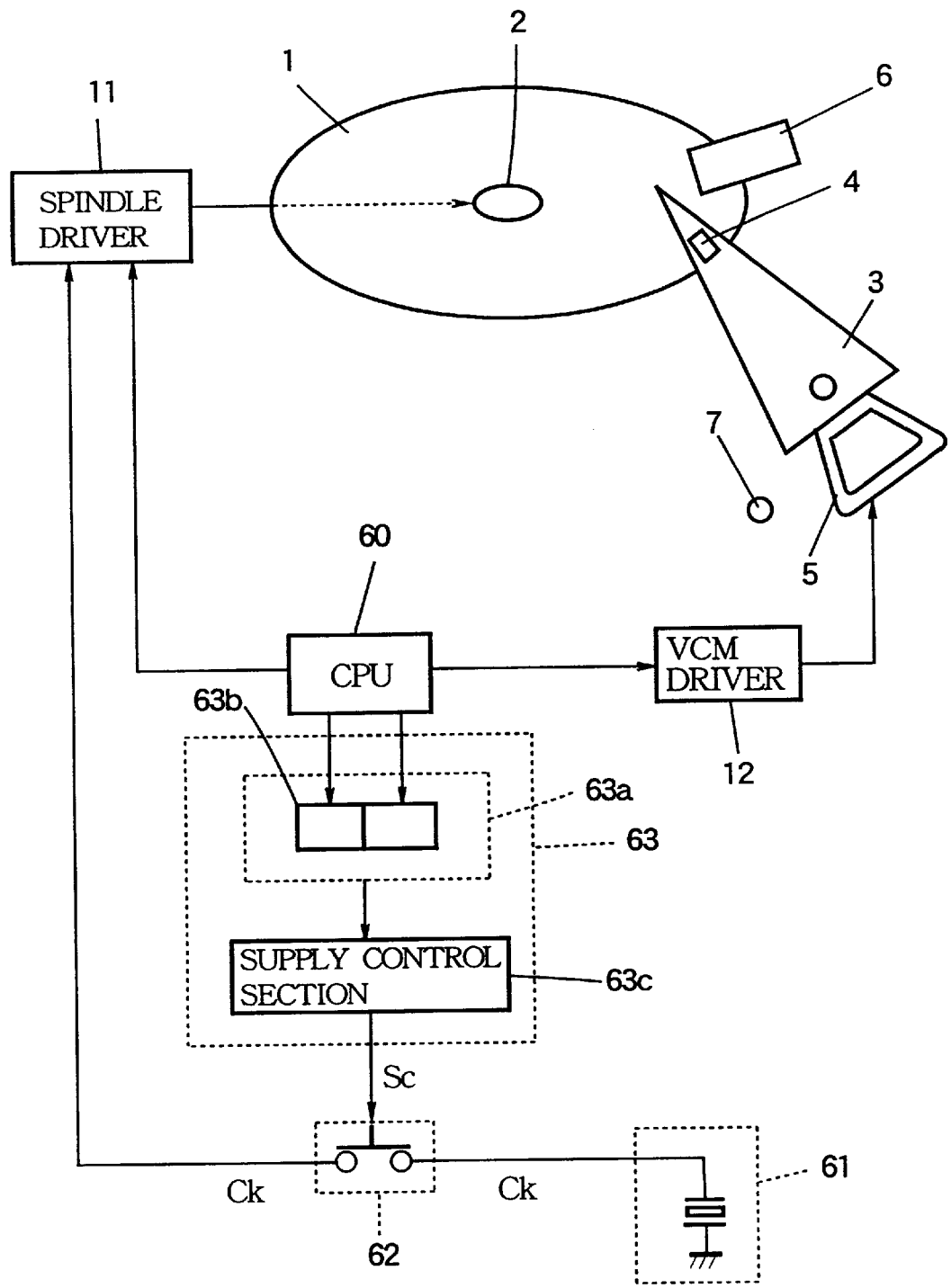
FIG. 14 is a drawing showing the configuration of the disk drive of embodiment 6 of the present invention.

FIG. 14 is a drawing showing the configuration of the disk drive of embodiment 6 of the present invention. The disk drive shown in FIG. 14 has a disk 1, a spindle motor, an actuator 3, a head/slider 4, a VCM coil 5, a ramp 6, a crash stop 7, a CPU 60, a spindle driver 11, a VCM driver 12, a clock signal generating circuit 61, a switching circuit 62, and a signal supply controller 63. Elements in FIG. 14 that are the same as in FIG. 1 have the same reference numerals.

The clock generating circuit 61 generates, for example, a 40-MHZ clock Ck. The clock Ck is supplied as a driving source signal to the spindle driver 11 through the switching circuit 62. The spindle driver 11 uses the clock Ck to generate driving signals for the spindle motor. The switching circuit 62 opens and closes according to a control signal Sc from the signal supply controller 63.

The signal supply controller 63 has a data receiving section 63a that receives word data from the CPU 60, and a supply control section 63c that opens the switching circuit 62 by means of the control signal Sc, causing the supply of the clock Ck to the spindle driver 11 to be stopped, when a key word is received by the data receiving section 63a; that is, when the above word data matches a pre-stored key word.

The data receiving section 63a has, for example, a 2-bit register 63b. One data word comprises, for example, combined parallel/serial 2×2-bit data. One word, that is, is a combined parallel/serial data word comprising two bits of parallel data b11 and b12 (not shown) received by register 63b, and the two bits of parallel data b21 and b22 (not shown) received by register 63b following this parallel data b11 and b12.

The key word pre-stored in the supply control section 63c is a data word in which, for example, able, "b12, b21, b22" equals "0, 1, 1, 0." When the data word received by register 63b matches the above key word, the switching circuit 62 is opened by the control signal Sc, and the supply of the clock Ck to the spindle driver 11 is stopped. When the supply of the clock Ck is stopped, the spindle driver 11 can no longer drive the spindle motor, so the spindle motor stops, whereby the rotation of the disk 1 stops. The stopping of the supply of the clock Ck to the spindle driver 11 is performed, for example, in the power-saving mode.

If the head/slider 4 is over the disk 1 when the spindle motor is stopped by the stopping of the supply of the clock Ck, however, an accidental landing is apt to occur. Malfunctions of the signal supply controller can lead to an accidental landing. Conventional signal supply controllers were configured to stop the supply of the clock Ck when bit data with a predetermined value was received, but there was the risk that bit data with the above predetermined value might be sent to the signal supply controller by mistake, due to program-code misbehavior or the like in the CPU 60, and that the signal supply controller might malfunction.

A feature of the signal supply controller 63 of the present invention is that it stops the supply of the clock Ck when a key word is received. The risk that a key word might be sent by mistake to the signal supply controller 63, due to program-code misbehavior or the like in the CPU 60, is smaller than the risk of the mistaken sending of predetermined bit data. The risk of mistaken sending of a key word can be reduced without limit by increasing the number of bits in the word data. Accidental landings due to malfunctions of the signal supply controller can accordingly be prevented by controlling the supply of the clock Ck by a key word, thus avoiding malfunctions of the signal supply controller.

Thus according to embodiment 6, accidental landings due to malfunctions of the signal supply controller can be prevented by controlling the supply of the clock Ck to the spindle driver 11 by using a signal supply controller 63 that stops the supply of the clock Ck upon receiving a key word.

The word unit may be n×m bits (where n and m are positive integers). The signal supply controller 63 can be employed not only for the supply of the clock, but also for the supply of power supply and other driving source signals. Also, the signal supply controller 63 can be employed not only for the spindle driver 11, but also for the supply of driving source signals to the driving circuits of other operating mechanisms. In addition, the signal supply controller 63 can also be employed in CSS-type disk drives.

According to the head mechanism controller of the present invention and a disk drive using this controller, during the loading of the transducer head, if a shock requiring loading to be stopped is sensed, loading is stopped and unloading is performed, and during the unloading of the transducer head with velocity control, if a shock requiring velocity control to be stopped is sensed, velocity control is stopped and unloading without control of the velocity of the transducer head is performed, with the effect that accidental landings can be prevented even if a shock is received during loading or unloading, as described above.

According to another head mechanism controller of the present invention and a disk drive using this controller, the effect of preventing accidental landings due to rotational speed abnormalities of the recording medium is obtained by confirming that the rotational speed of the recording medium is within a predetermined range before causing the transducer head to move into a predetermined area on the recording medium, and by causing the transducer head to withdraw from the predetermined area on the recording medium if the rotational speed of the recording medium departs from the predetermined range.

According to another head mechanism controller of the present invention and a disk drive using this controller, when the rotational speed setting of the recording medium is changed from a first rotational speed to a second rotational speed, the effect of preventing accidental landings due to rotational speed abnormalities of the recording medium when the rotational speed is changed is obtained by causing unloading of the transducer head to be performed before allowing the change of the spindle rotational speed of the recording medium to be performed, and by confirming that the spindle rotational speed is within a predetermined range in relation to the second rotational speed, then causing the loading of the transducer head to be performed.

According to another head mechanism controller of the present invention and a disk drive using this controller, the effect of preventing accidental landings, even if the withdrawal control means malfunctions, is obtained by resetting a supervisory timer each time the recording medium makes a predetermined number of rotations, and by causing a withdrawal of the transducer head to be performed, irrespective of the withdrawal control means, if the supervisory timer times up.

According to the signal supply controller of the present invention and a disk drive using this controller, malfunction of the signal supply controller can be avoided by stopping the supply of driving source signals when a key word is received, with the effect that accidental landings due malfunction of the signal supply controller can be prevented.

What is claimed is:

1. A disk drive comprising:
   a load/unload mechanism to position a head/slider mounted on an actuator over a disk and remove the head/slider from proximity with the disk;
   a shock sensor for detecting shock events;
   a load/unload control means for aborting loading and for causing the actuator to be unloaded from the disk when a shock event detected by the shock sensor exceeds a threshold;
   a first analog to digital converter connected to the shock sensor which outputs a digital value corresponding to an analog voltage generated by the shock sensor in response to shock;
   a CPU which executes stored program code to read the digital value from the first analog to digital converter and compare the digital value to the threshold;
   a counter which tracks a number of aborted attempts in a selected time period the loading has been aborted; and
   program code executed by the CPU for ending attempts to load if the number of aborted attempts has reached a predetermined number.

2. A disk drive comprising:
   a load/unload mechanism to position a head/slider mounted on an actuator over a disk and remove the head/slider from proximity with the disk;
   a shock sensor for detecting shock events;
   a load/unload control means for aborting loading and for causing the actuator to be unloaded from the disk when a shock event detected by the shock sensor exceeds a threshold;
   an actuator velocity detector which outputs a signal corresponding to a velocity of the actuator; and
   the load/unload control means using the signal from the actuator velocity detector to begin unloading the actuator under feedback control of the velocity of the actuator, the load/unload control means further responding to a shock event detected by the shock sensor during unloading the actuator under feedback control of the velocity of the actuator by driving the actuator with a predetermined current profile, regardless of the velocity of the actuator.

* * * * *